United States Patent [19]
Liang

[11] Patent Number: 5,942,735
[45] Date of Patent: Aug. 24, 1999

[54] SHOCK ABSORBING FOOT MEANS ADAPTED FOR SUPPORTING AN AUDIO EQUIPMENT ON A FLAT SURFACE

[76] Inventor: Shih-Tsung Liang, No. 10, Lane 31, Ta-Feng St., Lu-Chu Hsiang, Taoyuan County, Taiwan

[21] Appl. No.: 09/153,048

[22] Filed: Sep. 15, 1998

[51] Int. Cl.[6] ............................. F16F 15/00; F16M 3/00
[52] U.S. Cl. ......................... 181/207; 248/638; 248/677
[58] Field of Search .................................. 181/207, 208, 181/209; 248/638, 677, 678

[56] References Cited

U.S. PATENT DOCUMENTS

| | | | |
|---|---|---|---|
| 4,880,077 | 11/1989 | Verse et al. | 181/207 |
| 5,771,990 | 6/1998 | Liang | 181/208 |
| 5,804,776 | 9/1998 | Bizlewicz | 181/207 |

*Primary Examiner*—Khanh Dang
*Attorney, Agent, or Firm*—Rosenberg, Klein & Bilker

[57] ABSTRACT

A shock absorbing foot device adapted for supporting an audio equipment on a flat surface, including a base adhered to a flat surface, a receptacle fastened to the base by a screw joint and having a top open chamber, a steel ball mounted in the top open chamber of the base, a mounting plate adhered to a bottom side of an audio equipment and having a recessed bottom hole, and a support rod having a rounded top end inserted into the recessed bottom center hole of the mounting plate and secured in place by a shock absorbing ring, a flat bottom end inserted into the top open chamber of the receptacle and supported on the steel ball and secured in place by shock absorbing rings.

5 Claims, 4 Drawing Sheets ium, 735

SHOCK ABSORBING FOOT MEANS ADAPTED FOR SUPPORTING AN AUDIO EQUIPMENT ON A FLAT SURFACE

BACKGROUND OF THE INVENTION

The present invention relates to foot means adapted for supporting an audio equipment on a flat surface, and more particularly to such foot means which effectively absorb shocks from the audio equipment supported thereon.

U.S. Pat. No. 5,771,990 indicates shock absorbing foot means adapted for supporting an audio equipment on a flat surface. This structure of shock absorbing foot means comprises a base adhered to a flat surface and having a top screw hole, a mounting plate adhered to a bottom side of an audio equipment and having a rounded recess at its bottom center, a receptacle threaded into the top screw hole of the base and having a top open chamber and a rounded recess at the center of the bottom of the top open chamber, and a support member having a plurality of projecting portions disposed in contact with the periphery of the top open chamber and two cones respectively engaging the rounded recess of the mounting plate and the rounded recess of the receptacle. This structure of shock absorbing foot means is functional and effective.

SUMMARY OF THE INVENTION

According to the present invention, shock absorbing support means is coupled between a receptacle in a base on a flat surface and a mounting plate at a bottom side of an audio equipment to absorb shock waves. According to a first embodiment of the present invention, the shock absorbing support means is comprised of a steel ball mounted in the receptacle, and a support rod, which supports the mounting plate and the audio equipment on the steel ball. According to a second embodiment of the present invention, the shock absorbing support means comprises a first support member mounted in a top open chamber on the receptacle and having two cones at two opposite ends, and a second support member having a flat bottom end supported on the cone at the top side of the first support member and a rounded top end engaging a recessed bottom center hole at the mounting plate. According to a third embodiment of the present invention, the shock absorbing support means is comprised of a plurality of steel balls respectively mounted in a top open chamber of the receptacle and a recessed bottom center hole of the mounting plate and arranged in a stack and retained in contact with the peripheral wall of the top open chamber of the receptacle, and a shock absorbing ring mounted in an inside annular groove inside the recessed bottom center hole of the mounting plate around the periphery of one of the steel balls. Other forms of the shock absorbing support means may be used to support the mounting plate and the audio equipment on the receptacle and the base.

DETAILED DESCRIPTION OF THE PREFERRED EMBODIMENT

Figure 1:
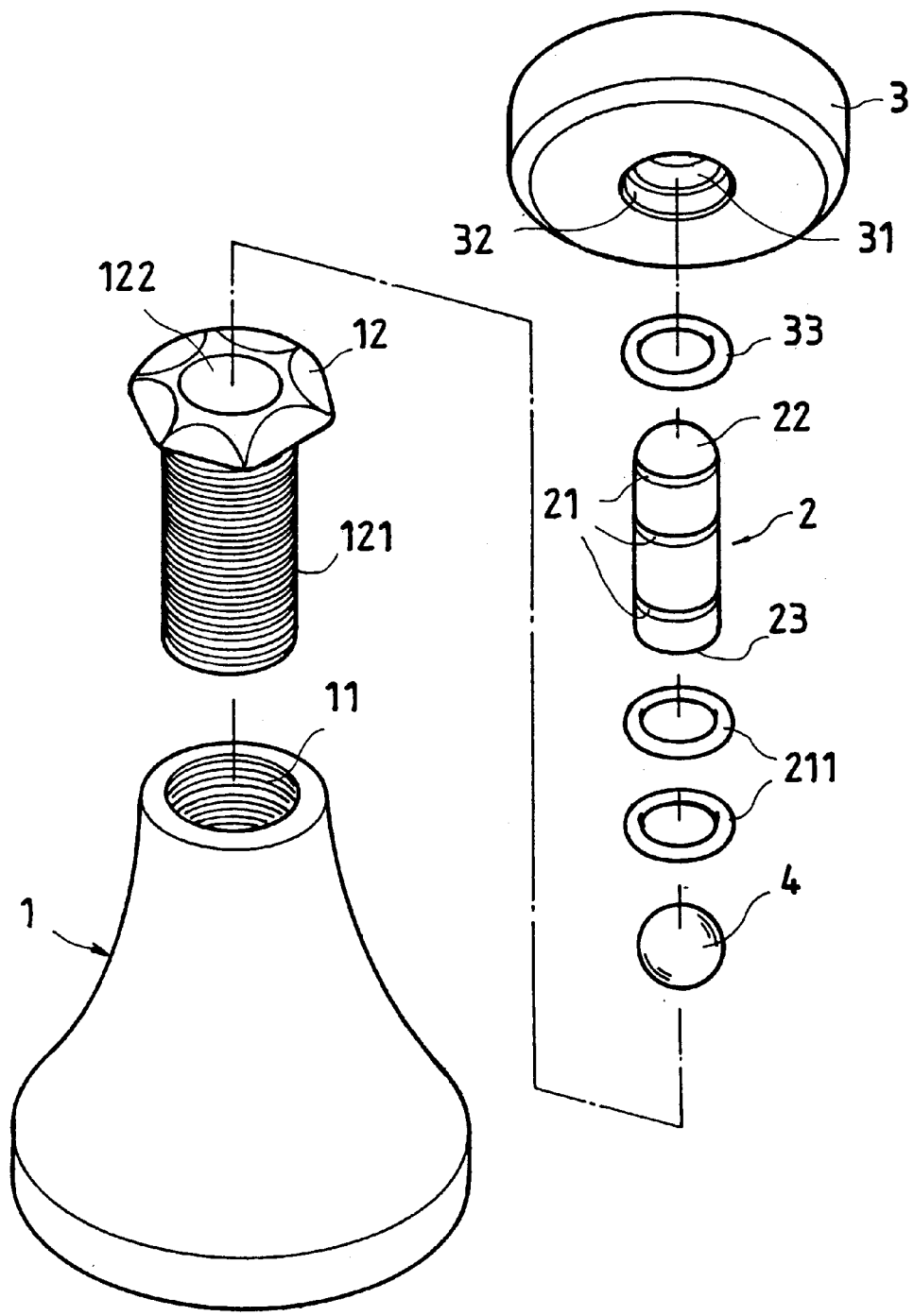
FIG. 1 is an exploded view of a shock absorbing foot device according to a first embodiment of the present invention.
Figure 2:
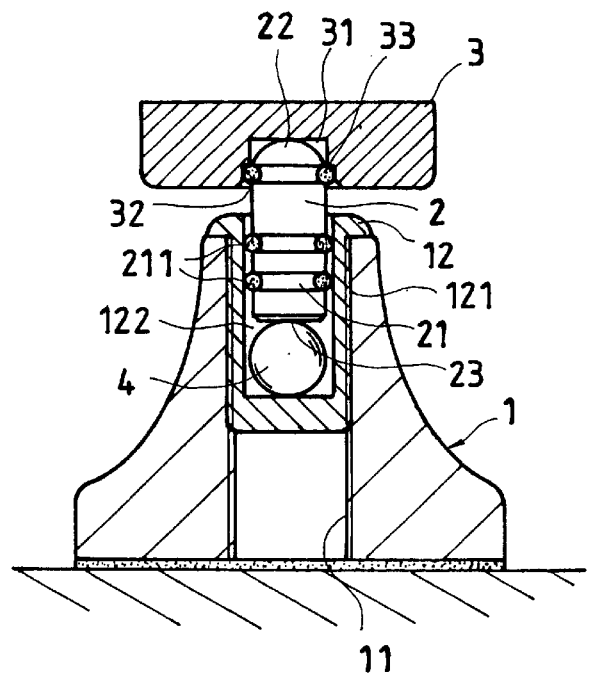
FIG. 2 is a sectional assembly view of the shock absorbing foot device shown in FIG. 1.

Referring to FIGS. 1 and 2, a shock absorbing foot device in accordance with a first embodiment of the present invention is generally comprised of a conical base 1, a receptacle 12, a steel ball 4, a support rod 2, and a mounting plate 3. The conical base 1 is adhered to a flat surface, having a top screw hole 11. The mounting plate 3 is adhered to a bottom side of an audio equipment, having a recessed bottom center hole 31 and an inside annular groove 32 inside the recessed bottom center hole 31. The receptacle 12 comprises an outer thread 121 threaded into the top screw hole 11, and a top open chamber 122. The steel ball 4 is mounted inside the top open chamber 122. The support rod 2 has a rounded top end 22 inserted into the recessed bottom center hole 31 on the mounting plate 3, a flat bottom end 23 inserted into the top open chamber 122 and supported on the steel ball 4, and three outside annular grooves 21 provided around the periphery at different elevations. A positioning ring 33 is mounted in the top annular groove 21 around the support rod 2 and fastened to the inside annular groove 32 inside the recessed bottom center hole 31 of the mounting plate 3. Two flexible shock absorbing rings 211 are respectively mounted in the other two annular grooves 21 around the support rod 2 and fastened to the periphery wall of the top open chamber 122 inside the receptacle 12. When assembled, the rounded top end 22 and the flat bottom end 23 of the support rod 2 are respectively disposed in contact with the inside bottom wall of the recessed bottom center hole 31 and the periphery of the steel ball 4, therefore when shock waves are transmitted from the audio equipment, the support rod 2 is vibrated on the steel ball 4 to eliminate shock waves and to prevent shock waves from passing to the conical base 1.

Figure 3:
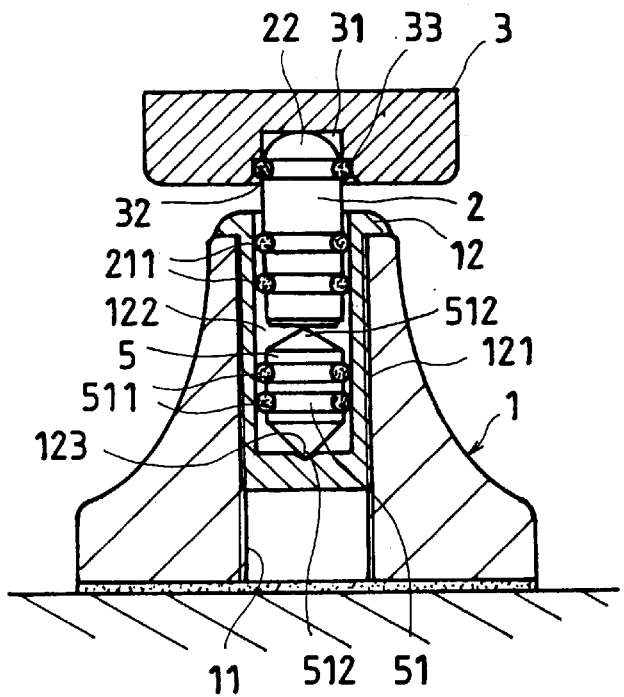
FIG. 3 is a sectional view of a shock absorbing foot device according to a second embodiment of the present invention.

FIG. 3 shows a shock absorbing foot device according to a second embodiment of the present invention. According to this alternate form, a support member 5 is used instead of the aforesaid steel ball 4, and mounted inside the top open chamber 122 of the receptacle 12 to support the support rod 2. The support member 5 comprises two cones 512 at top and bottom ends thereof, and a plurality of outside annular grooves 51 provided around the periphery at different elevations between the cones 512, and a plurality of flexible shock absorbing rings 511 respectively mounted in the outside annular grooves 51. When installed, the flexible shock absorbing rings 511 are retained in close contact with the peripheral wall of the top open chamber 122 inside the receptacle 2, the cones 512 are respectively retained engaging a rounded recess 123 at the center of the bottom of the top open chamber 122 and the center of the bottom edge of the flat bottom end of the support rod 2.

Figure 4:
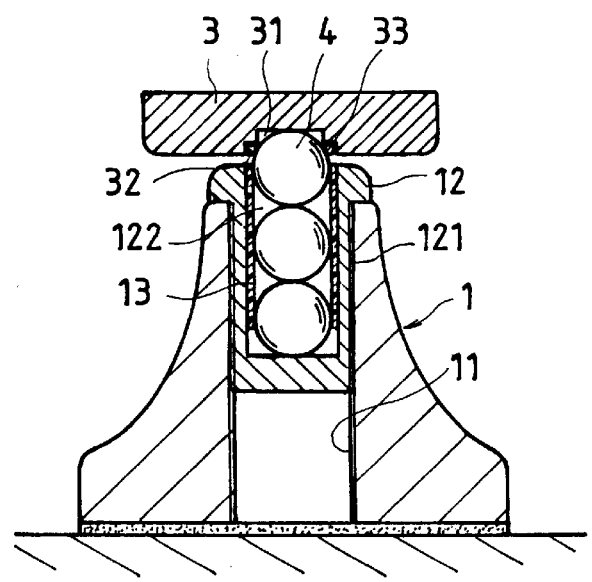
FIG. 4 is a sectional view of a shock absorbing foot device according to a third embodiment of the present invention.

FIG. 4 shows a shock absorbing foot device according to a third embodiment of the present invention. According to this alternate form, a plurality of steel balls 4 are mounted in the top open chamber 122 of the receptacle 12 and the recessed bottom hole 31 of the mounting plate 3 and arranged in a stack to effectively eliminate shock waves from the audio equipment, and a shock absorbing positioning ring 33 is mounted in the inside annular groove 32 inside the recessed bottom center hole 31 of the mounting plate 4 around the periphery of the top steel ball 4.

Figure 5:
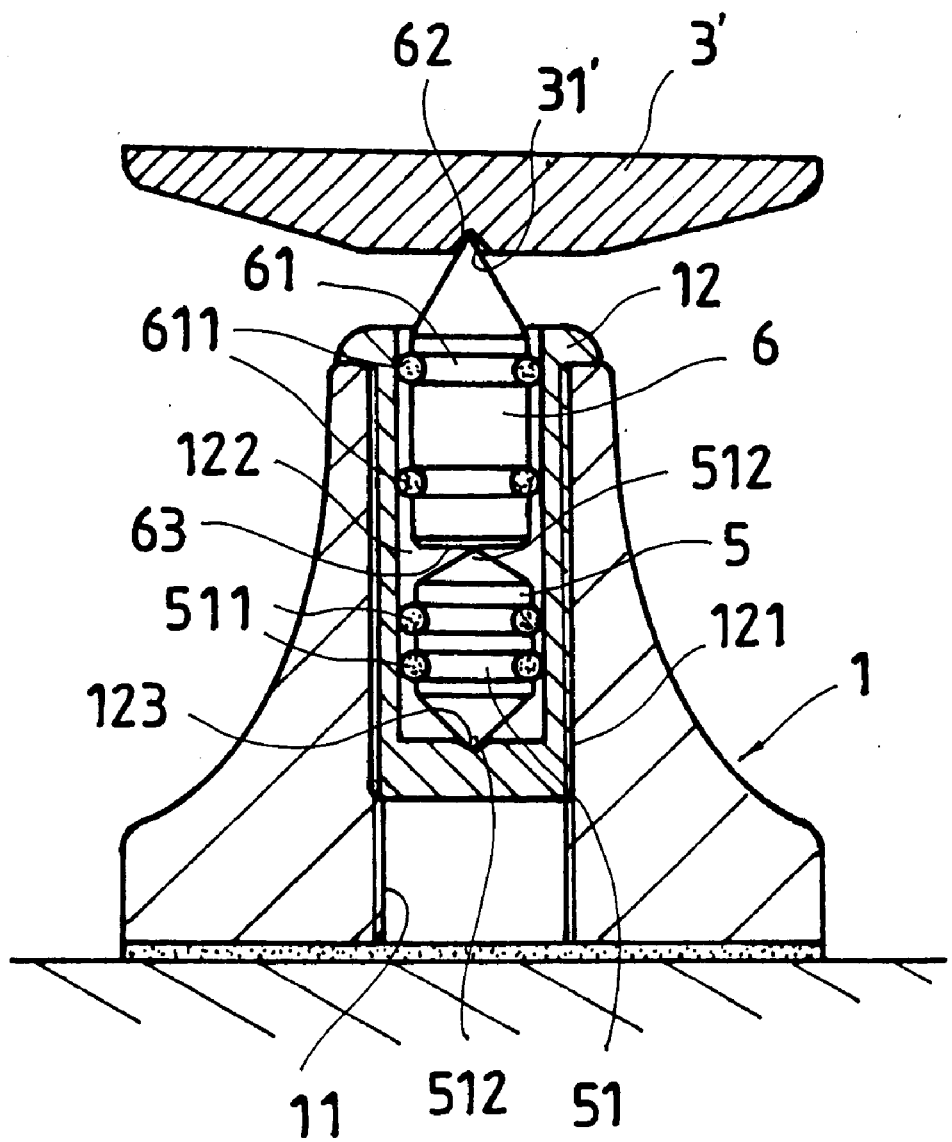
FIG. 5 is a sectional view of a shock absorbing foot device according to a fourth embodiment of the present invention.

FIG. 5 shows a shock absorbing foot device according to a fourth embodiment of the present invention. This embodiment comprises a conical base 1 having a top screw hole 11, a receptacle 12 having an outer thread 121 threaded into the top screw hole 11 and a top open chamber 121 and a rounded recess 123 at the center of the bottom of the top open chamber 121, a mounting plate 3' adhered to a bottom side of an audio equipment and having a rounded recess 31' at its bottom center, a first support member 5 mounted inside the top open chamber 122 of the receptacle 12, and a second support member 6 coupled between the first support member 5 and the mounting plate 3'. The first support member 5 comprises two cones 512 at its top and bottom ends respectively engaging the rounded recess 123 inside the top open chamber 122 of the receptacle 12 and a flat bottom edge 63 at the second support member, a plurality of outside annular grooves 51 provided around the periphery at different elevations, and a plurality of flexible shock absorbing rings 511 respectively mounted in the outside annular grooves 51 and retained in close contact with the peripheral wall of the top open chamber 122 inside the receptacle 12. The second support member 6 has a top cone 62 engaging the rounded recess 31' of the mounting plate 3', a flat bottom edge 63 supported on the cone 512 at the top of the first support member 5, a plurality of outside annular grooves 61 provided around the periphery at different elevations, and a plurality of flexible shock absorbing rings 611 respectively mounted in the outside annular grooves 61 and retained in close contact with the peripheral wall of the top open chamber 122 in the receptacle 2.

Figure 6:
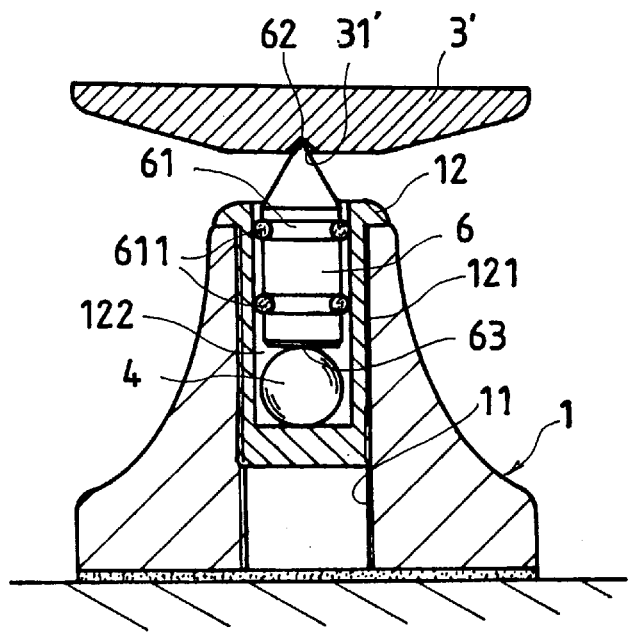
FIG. 6 is a sectional view of a shock absorbing foot device according to a fifth embodiment of the present invention.

FIG. 6 shows a shock absorbing foot device according to a fifth embodiment of the present invention. According to this embodiment, the shock absorbing foot device is comprised of a conical base 1, a mounting plate 3', a receptacle 12, a first support member (the steel ball shown in FIG. 1) 4, and a second support member 6. The structure of the second support member 6 is identical to that shown in FIG. 5. The structure of the mounting plate 3' is identical to that shown in FIG. 5. This embodiment can also effectively absorb shocks from the audio equipment supported thereon.

What the invention claimed is:

1. A shock absorbing foot device comprising a base having a top screw hole, a receptacle threaded into the top screw hole of said base and having a top open chamber, a mounting plate adhered to a bottom side of an audio equipment, and shock absorbing support means coupled between said base and said mounting plate to absorb shocks from the audio equipment, wherein said mounting plate comprises a recessed bottom center hole at the center of a bottom side thereof and an inside annular groove inside said bottom center hole; said shock absorbing support means comprises a steel ball mounted in the top open chamber inside said base, and a support rod supporting said mounting plate on said steel ball, said support rod comprising a rounded top end inserted into the recessed bottom center hole of said mounting plate, a flat bottom end inserted into the top open chamber of said receptacle and supported on said steel ball, a plurality of locating grooves provided around the periphery thereof at different elevations, and a plurality of shock absorbing positioning rings respectively mounted in said locating grooves and engaging the annular groove inside the recessed bottom center hole of said mounting plate and the peripheral wall of the top open chamber of said receptacle to secure said support rod to said mounting plate and said receptacle above said steel ball.

2. A shock absorbing foot device comprising a base having a top screw hole, a receptacle threaded into the top screw hole of said base and having a top open chamber, a mounting plate adhered to a bottom side of an audio equipment, and shock absorbing support means coupled between said base and said mounting plate to absorb shocks from the audio equipment, wherein said mounting plate comprises a recessed bottom center hole at the center of a bottom side thereof and an inside annular groove inside said recessed bottom center hole; the top open chamber of said receptacle has a bottom wall and a rounded recess at the center of the bottom wall; said shock absorbing support means comprises a first support member mounted in the top open chamber of said receptacle and a second support member mounted in the recessed bottom center hole of said mounting plate and supported on said first support member, said first support member comprising a bottom cone raised from a bottom side thereof and engaging the rounded recess at the bottom wall of the top open chamber of said receptacle, a top cone raised from a top side thereof, a plurality of annular grooves provided around the periphery thereof at different elevations, and a plurality of shock absorbing rings respectively mounted in the annular grooves of said first support member and disposed in contact with the peripheral wall of the top open chamber of said receptacle, said second support member comprising a rounded head inserted into the recessed bottom center hole of said mounting plate, a flat bottom end inserted into the top open chamber of said receptacle and supported on the top cone of said first support member, a plurality of outside annular grooves provided around the periphery thereof at different elevations, and a plurality of shock absorbing rings respectively mounted in the annular grooves around said second support member and engaging the inside annular groove in the recessed bottom center hole of said receptacle and the peripheral wall of the top open chamber of said receptacle.

3. A shock absorbing foot device comprising a base having a top screw hole, a receptacle threaded into the top screw hole of said base and having a top open chamber, a mounting plate adhered to a bottom side of an audio equipment, and shock absorbing support means coupled between said base and said mounting plate to absorb shocks from the audio equipment, wherein said mounting plate comprises a recessed bottom center hole at the center of a bottom side thereof and an inside annular groove inside said recessed bottom center hole; said shock absorbing support means comprises a plurality of steel balls respectively mounted in the top open chamber of said receptacle and the recessed bottom center hole of said mounting plate and arranged in a stack and retained in contact with the peripheral wall of the top open chamber of said receptacle, and a shock absorbing ring mounted in the inside annular groove inside said recessed bottom center hole of said mounting plate around the periphery of one of said steel balls.

4. A shock absorbing foot device comprising a base having a top screw hole, a receptacle threaded into the top screw hole of said base and having a top open chamber, a mounting plate adhered to a bottom side of an audio equipment, and shock absorbing support means coupled between said base and said mounting plate to absorb shocks from the audio equipment, wherein said mounting plate has a rounded recess at the center of a bottom side thereof; said top open chamber of said receptacle has a bottom wall and a rounded recess at the center of the bottom wall; said shock absorbing support means comprises a first support member mounted in the top open chamber of said receptacle and a second support member mounted in the recessed bottom center hole of said mounting plate and supported on said first support member, said first support member comprising a bottom cone raised from a bottom side thereof and engaging the rounded recess at the center of the bottom wall of the top open chamber of said receptacle, a top cone raised from a top side thereof, a plurality of annular grooves provided around the periphery thereof at different elevations, and a plurality of shock absorbing rings respectively mounted in the annular grooves of said first support member and disposed in contact with the peripheral wall of the top open chamber of said receptacle, said second support member comprising a top cone raised from a top side thereof and engaging the rounded recess at said mounting plate, a flat bottom end inserted into the top open chamber of said receptacle and supported on the top cone of said first support member, a plurality of outside annular grooves provided around the periphery thereof at different elevations, and a plurality of shock absorbing rings respectively mounted in the annular grooves around said second support member and retained in contact with the peripheral wall of the top open chamber of said receptacle.

5. A shock absorbing foot device comprising a base having a top screw hole, a receptacle threaded into the top screw hole of said base and having a top open chamber, a mounting plate adhered to a bottom side of an audio equipment, and shock absorbing support means coupled between said base and said mounting plate to absorb shocks from the audio equipment, wherein said mounting plate has a rounded recess at the center of a bottom side thereof; said shock absorbing support means comprises a steel ball mounted in the top open chamber of said receptacle, a support rod having a flat bottom end inserted into the top open chamber of said receptacle and supported on said steel ball and a cone raised from a top side thereof and engaging the rounded recess of said mounting plate and a plurality of outside annular grooves provided around the periphery thereof at different elevations, and a plurality of shock absorbing rings respectively mounted in the outside annular grooves around said support rod and retained in contact with the peripheral wall of said top open chamber of said receptacle.

* * * * *